US012670069B2

(12) United States Patent
Zhang et al.

(10) Patent No.: US 12,670,069 B2
(45) Date of Patent: Jun. 30, 2026

(54) SELF-LEARNING ASYMMETRIC BIT-FLIPPING DECODER FOR MEMORY DEVICES

(71) Applicant: SK hynix Inc., Icheon-si (KR)

(72) Inventors: Fan Zhang, Fremont, CA (US); Pengfei Huang, San Jose, CA (US); Meysam Asadi, San Jose, CA (US)

(73) Assignee: SK HYNIX INC., Icheon-si (KR)

( * ) Notice: Subject to any disclaimer, the term of this patent is extended or adjusted under 35 U.S.C. 154(b) by 40 days.

(21) Appl. No.: 18/964,591

(22) Filed: Dec. 1, 2024

(65) Prior Publication Data

US 2026/0154156 A1 Jun. 4, 2026

(51) Int. Cl.
*G06F 11/10* (2006.01)
(52) U.S. Cl.
CPC .................................. *G06F 11/1076* (2013.01)
(58) Field of Classification Search
CPC .................................................... G06F 11/1076
USPC ........................................................ 714/6.21
See application file for complete search history.

(56) References Cited

U.S. PATENT DOCUMENTS

| | | | |
|---|---|---|---|
| 11,854,629 B2 | 12/2023 | Zhang et al. | |
| 11,881,869 B1 | 1/2024 | Asadi et al. | |
| 11,984,910 B1 | 5/2024 | Fan et al. | |
| 12,184,305 B1 * | 12/2024 | Asadi ...................... | G06N 3/08 |
| 2025/0202502 A1 * | 6/2025 | Asadi ................ | H03M 13/1108 |

* cited by examiner

*Primary Examiner* — Yair Leibovich
(74) *Attorney, Agent, or Firm* — Perkins Coie LLP

(57) ABSTRACT

Systems and methods for improving performance of a memory device, which includes a bit-flipping (BF) decoder, are described. The disclosed embodiments improve the performance of the memory device by selecting parameters for the BF decoder that are optimized for current conditions of the memory device An example method includes performing a first number of decoding iterations on a received codeword, tracking the number of bit errors during the decoding, and determining, based thereon, an asymmetric ratio associated with the codeword. The method further includes determining, based on the asymmetric ratio and a checksum associated with the codeword, a current set of parameters for configuring the BF decoder, and performing a second number of decoding iterations on the codeword to generate data that was encoded. An example system includes the BF decoder and a memory controller that are configured to perform the above-described method.

20 Claims, 11 Drawing Sheets

Memory System

110

| 102 | 104 | 106 | | 108 |
|---|---|---|---|---|
| Memory Area | Memory Area | Memory Area | | Memory Area |
| Memory Unit (e.g., block, page) | Memory Unit (e.g., block, page) | Memory Unit (e.g., block, page) | | Memory Unit (e.g., block, page) |
| Memory Unit | Memory Unit | Memory Unit | . . . | Memory Unit |
| . . . | . . . | . . . | | . . . |
| Memory Unit | Memory Unit | Memory Unit | | Memory Unit |

120

121    Memory Interface (e.g., NAND memory interface)

| 122 | 123 | 124 | 125 |
|---|---|---|---|
| System Memory | Buffer/Cache | Processor | ECC Engine |

126    Host Interface (e.g., SATA, PATA, SD, USB, PCLe)

*FIG. 1*

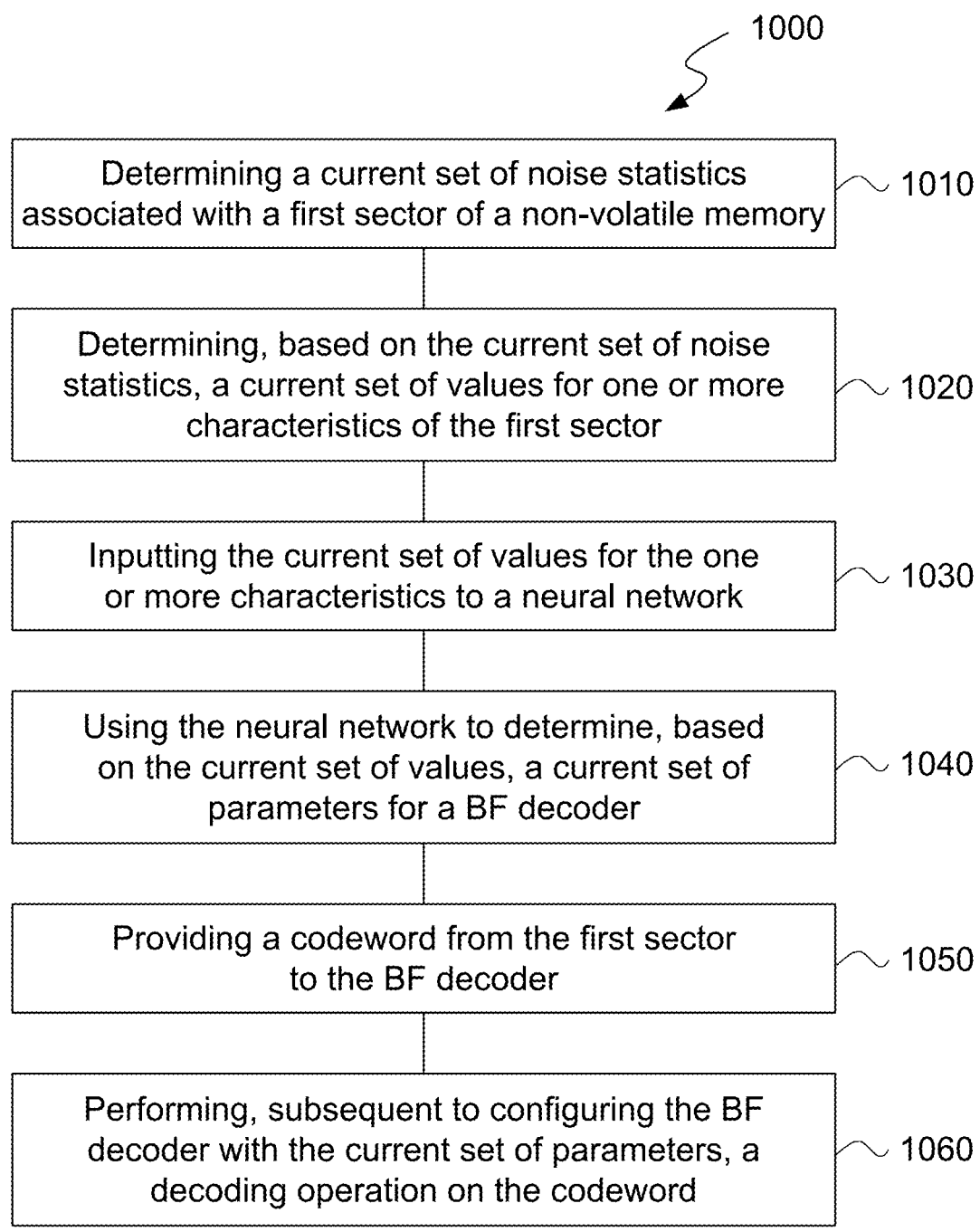

1000

Determining a current set of noise statistics associated with a first sector of a non-volatile memory ⌐∿ 1010

Determining, based on the current set of noise statistics, a current set of values for one or more characteristics of the first sector ⌐∿ 1020

Inputting the current set of values for the one or more characteristics to a neural network ⌐∿ 1030

Using the neural network to determine, based on the current set of values, a current set of parameters for a BF decoder ⌐∿ 1040

Providing a codeword from the first sector to the BF decoder ⌐∿ 1050

Performing, subsequent to configuring the BF decoder with the current set of parameters, a decoding operation on the codeword ⌐∿ 1060

*FIG. 10*

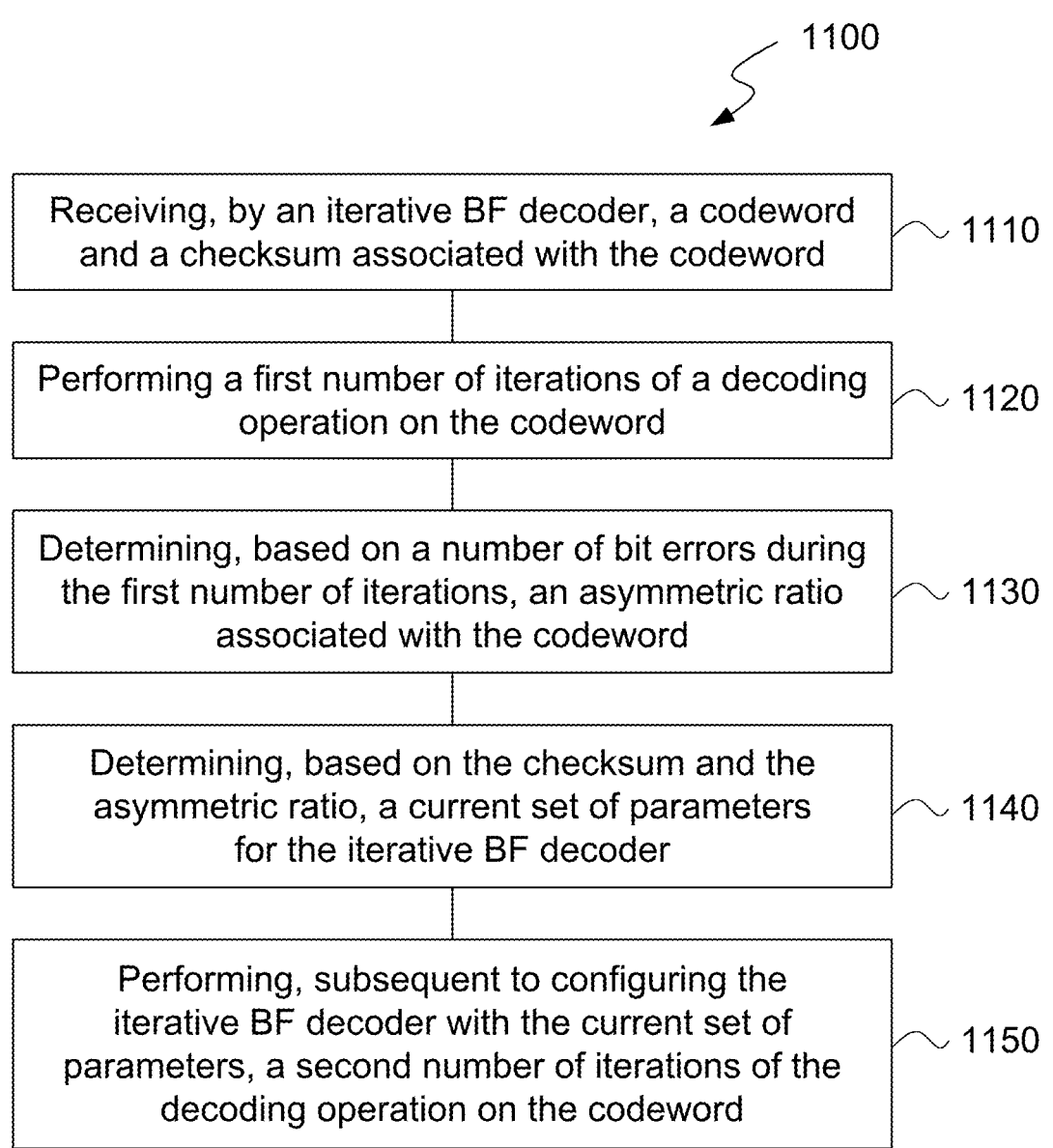

1100

Receiving, by an iterative BF decoder, a codeword and a checksum associated with the codeword    1110

Performing a first number of iterations of a decoding operation on the codeword    1120

Determining, based on a number of bit errors during the first number of iterations, an asymmetric ratio associated with the codeword    1130

Determining, based on the checksum and the asymmetric ratio, a current set of parameters for the iterative BF decoder    1140

Performing, subsequent to configuring the iterative BF decoder with the current set of parameters, a second number of iterations of the decoding operation on the codeword    1150

*FIG. 11*

SELF-LEARNING ASYMMETRIC BIT-FLIPPING DECODER FOR MEMORY DEVICES

TECHNICAL FIELD

This patent document generally relates to memory devices, and more specifically, to bit-flipping decoders used in memory devices.

BACKGROUND

Data integrity is an important feature for any data storage device and data transmission. In memory storage devices (e.g., NAND flash), information is stored in a cell by different charge levels in a cell. During the write and read process, noise is introduced by program disturb and inter-cell interference charge leakage that causes the voltage level to drop over time, where the drop is proportional to the amount of charge stored as well as the number of program and erase (P/E) cycles a cell has experienced. Operating the memory storage devices based on their current conditions can increase the longevity and quality-of-service (QoS) of the memory storage devices.

SUMMARY

When non-volatile memory devices are transitioning from older to newer generations, there is a significant difference in the media quality variation over the life of the memory device. In some cases, the increase in the failed bit count (FBC) from the start-of-life (SOL) conditions to the end-of-life (EOL) conditions is based on the type of memory device, e.g., corresponding to a particular generation of the memory device. For example, the FBC increase in a quad-level cell (QLC) device, which supports 4 bits per cell, is four times greater than the FBC increase in a triple-level cell (TLC) NAND device, which supports 3 bits per cell. Furthermore, there can be additional variations due to different retention capabilities, read disturb error performances, temperatures, or wordline (WL) index access. Thus, the performance of memory device can be improved by leveraging the current conditions of the memory device.

Embodiments of the disclosed technology relate to methods, systems, and devices that improve performance of a memory device that uses a bit-flipping (BF) decoder. In an example, the performance of the memory device is improved by selecting parameters for the BF decoder that are optimized for current conditions of the memory device.

In an example aspect, a method for improving performance of a memory device is described. The method includes determining a current set of noise statistics associated with a first sector of a non-volatile memory of the memory device, and determining, based on the current set of noise statistics, a current set of values for one or more characteristics of the first sector of the non-volatile memory. The method further includes inputting the current set of values for the one or more characteristics to a neural network, and using the neural network to determine, based on the current set of values, a current set of parameters for a BF decoder in the memory device. After providing a codeword from the first sector to the BF decoder, the method includes performing, subsequent to configuring the BF decoder with the current set of parameters, a decoding operation on the codeword, using a parity check matrix associated with an error-correcting code, to generate data that was encoded. In this method, the neural network is trained using multiple sets of parameters for the BF decoder, and each of the multiple sets of parameters is associated with a set of noise statistics corresponding to one of multiple sets of values for the one or more characteristics of the non-volatile memory.

In another example aspect, a method for improving performance of a memory device is described. The method includes begins with receiving, by an iterative BF decoder in the memory device, a codeword and a checksum associated with the codeword. The method then includes performing a first number of iterations of a decoding operation on the codeword, determining, based on a number of bit errors during the first number of iterations, an asymmetric ratio associated with the codeword. The method further includes determining, based on the checksum and the asymmetric ratio, a current set of parameters for the iterative BF decoder, and performing, subsequent to configuring the iterative BF decoder with the current set of parameters, a second number of iterations of the decoding operation on the codeword to generate data that was encoded. In this method, a sum of the first number of iterations and the second number of iterations is less than or equal to a maximum number of iterations configured for the iterative BF decoder.

In yet another example aspect, the methods may be embodied in the form of an apparatus that includes a processor and a memory coupled to the processor.

In yet another example aspect, the methods may be embodied in the form of processor-executable instructions and stored on a computer-readable program medium.

The subject matter described in this patent document can be implemented in specific ways that provide one or more of the following features.

BRIEF DESCRIPTION OF THE DRAWINGS

FIG. 1 illustrates an example of a memory system.
FIGS. 10 and 11 illustrate flowcharts of example methods for improving the performance of a memory device.

DETAILED DESCRIPTION

Figure 2:
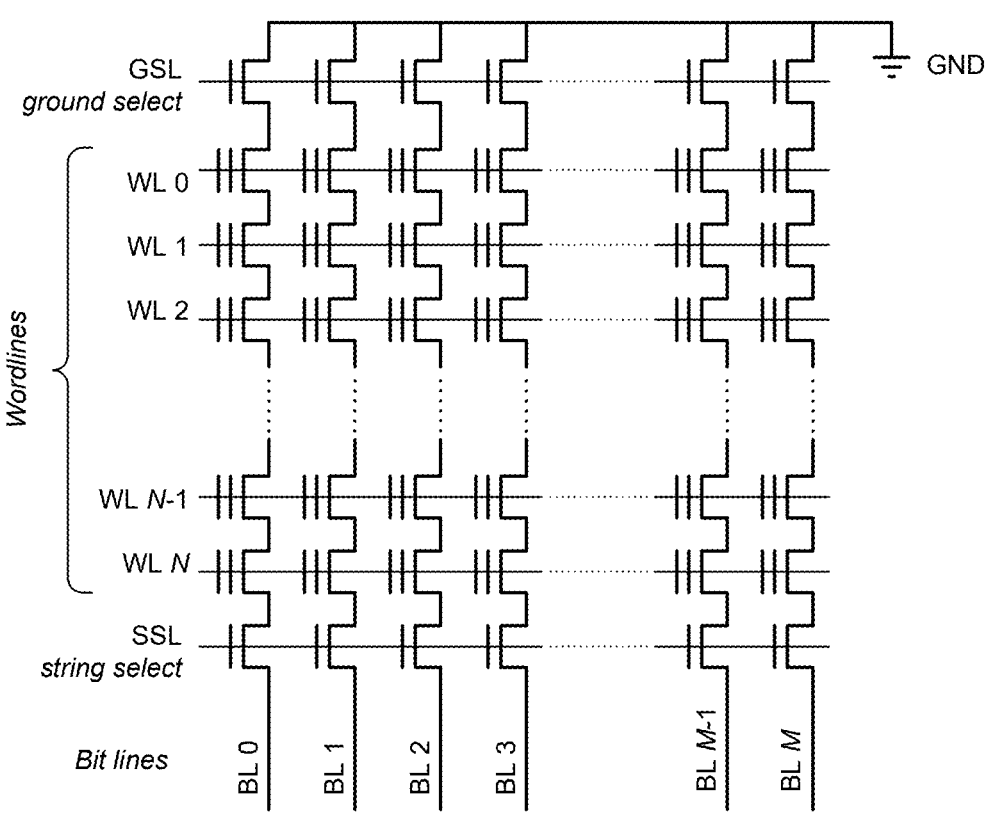
FIG. 2 is an illustration of an example non-volatile memory device.

Semiconductor memory devices may be volatile or nonvolatile. The volatile semiconductor memory devices perform read and write operations at high speeds, while contents stored therein may be lost at power-off. The nonvolatile semiconductor memory devices may retain contents stored therein even at power-off. The nonvolatile semiconductor memory devices may be used to store contents, which must be retained regardless of whether they are powered.

With an increase in a need for a large-capacity memory device, a multi-level cell (MLC) or multi-bit memory device storing multi-bit data per cell is becoming more common. However, memory cells in an MLC non-volatile memory device must have threshold voltages corresponding to four or more discriminable data states in a limited voltage window. For improvement of data integrity in non-volatile memory devices, the levels, and distributions of read voltages for discriminating the data states must be adjusted over the lifetime of the memory device to have optimal values during read operations and/or read attempts.

1 Introduction to Non-Volatile Memory Devices

FIGS. 1-6 overview a non-volatile memory system (e.g., a flash-based memory, NAND flash) in which embodiments of the disclosed technology may be implemented.

FIG. 1 is a block diagram of an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, and 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a block or a page that can be identified by a unique address such as a block address or a page address, respectively. For another example, wherein the memory areas 102, 104, 106, and 108 can include computer memories that include memory banks as a logical unit of data storage, the memory unit can be a bank that can be identified by a bank address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change random-access memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 102, 104, 106, and 108 can be configured to store at least one bit of information (e.g., one bit of information or multiple bits of information), and each of the memory cells in memory area 102, 104, 106, and 108 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to execute firmware-level code, and caches and memories 123 and 122, respectively to temporarily or persistently store executable firmware/instructions and associated information. In some implementations, the controller unit 120 can include an error correction engine 125 to perform error correction operation on information stored in the memory module 110. Error correction engine 125 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

FIG. 2 illustrates an example of a memory cell array implemented based on some embodiments of the disclosed technology.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block.

In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Figure 3:
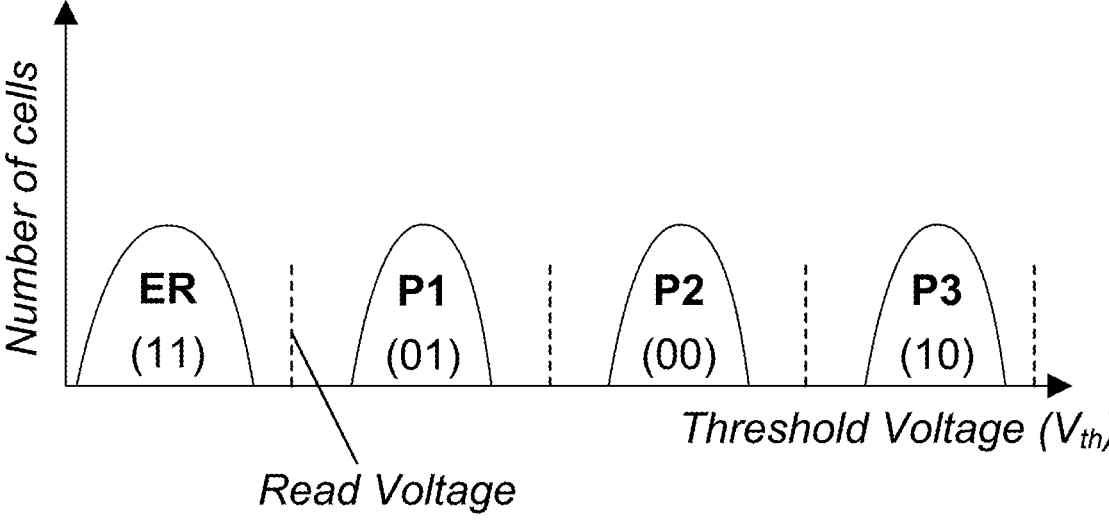
FIG. 3 is an example diagram illustrating the cell voltage level distribution ($V_{th}$) of a non-volatile memory device.

FIG. 3 illustrates an example of threshold voltage distribution curves in a multi-level cell device, wherein the number of cells for each program/erase state is plotted as a function of the threshold voltage. As illustrated therein, the threshold voltage distribution curves include the erase state (denoted "ER" and corresponding to "11") with the lowest threshold voltage, and three program states (denoted "P1", "P2" and "P3" corresponding to "01", "00" and "10", respectively) with read voltages in between the states (denoted by the dotted lines). In some embodiments, each of the threshold voltage distributions of program/erase states has a finite width because of differences in material properties across the memory array.

Although FIG. 3 shows a multi-level cell device by way of example, each of the memory cells can be configured to store any number of bits per cell. In some implementations, each of the memory cells can be configured as a single-level cell (SLC) to store one bit of information per cell, or as a triple-level cell (TLC) to store three bits of information per cell, or as a quad-level cells (QLC) to store four bits of information per cell.

In writing more than one data bit in a memory cell, fine placement of the threshold voltage levels of memory cells is needed because of the reduced distance between adjacent distributions. This is achieved by using incremental step pulse program (ISPP), i.e., memory cells on the same word-line are repeatedly programmed using a program-and-verify approach with a staircase program voltage applied to word-lines. Each programmed state associates with a verify voltage that is used in verify operations and sets the target position of each threshold voltage distribution window.

Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors, which will be discussed in the following, and such read errors may be managed in most situations by using error correction codes (ECCs).

Figure 4:
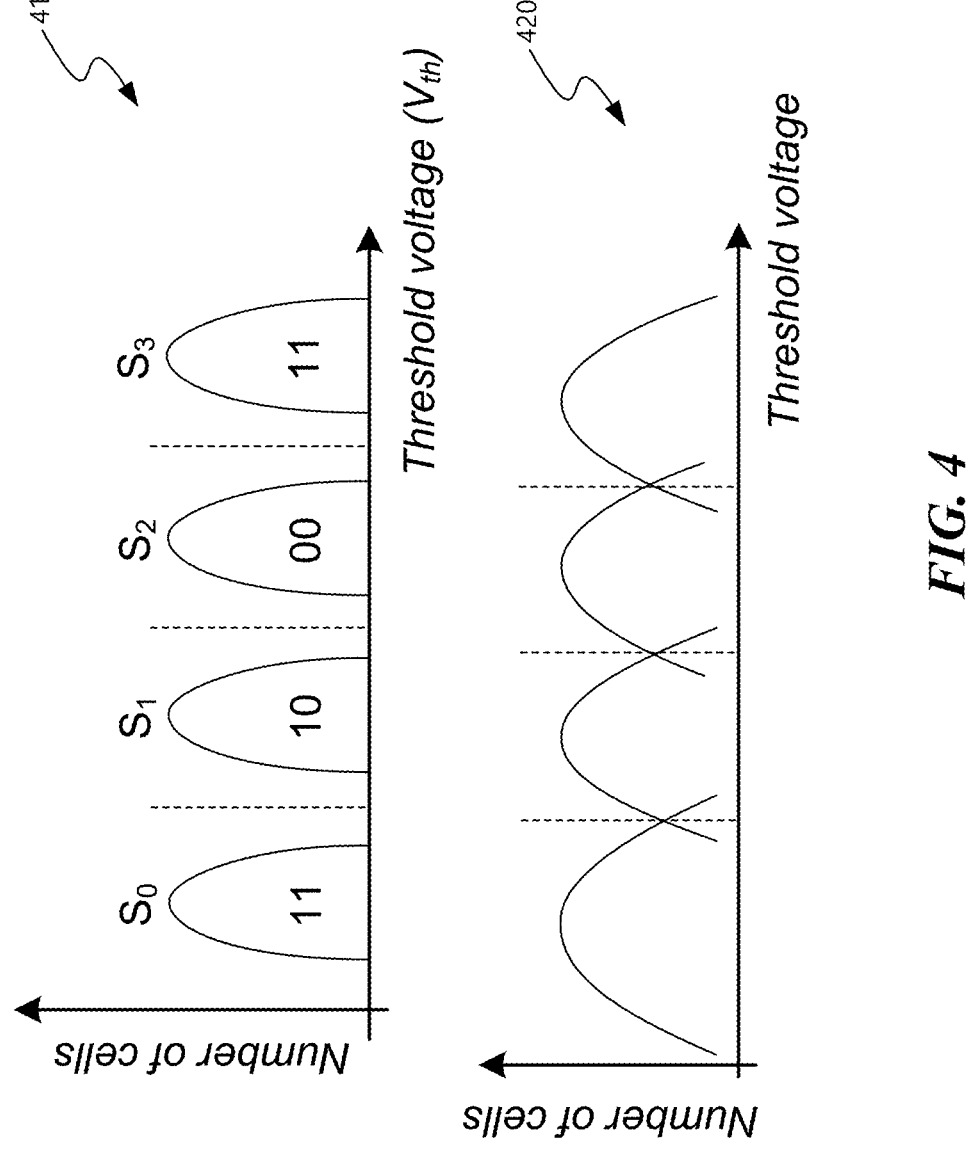
FIG. 4 is another example diagram illustrating the cell voltage level distribution ($V_{th}$) of a non-volatile memory device.

FIG. 4 illustrates an example of ideal threshold voltage distribution curves 410 and an example of distorted threshold voltage distribution curves 420. Herein, the vertical axis indicates the number of memory cells that have a particular threshold voltage, which is represented on the horizontal axis. For n-bit multi-level cell NAND flash memory, the threshold voltage of each cell can be programmed to $2^n$ possible values. In an ideal multi-level cell NAND flash memory, each value corresponds to a non-overlapping threshold voltage window (as shown by 410).

Flash memory P/E cycling causes damage to a tunnel oxide of floating gate of a charge trapping layer of cell transistors, which results in threshold voltage shift and thus gradually degrades memory device noise margin. As P/E cycles increase, the margin between neighboring distributions of different programmed states decreases and eventually the distributions start overlapping (as shown by 420). The data bit stored in a memory cell with a threshold voltage programmed in the overlapping range of the neighboring distributions may be misjudged as a value other than the original targeted value.

Figure 5:
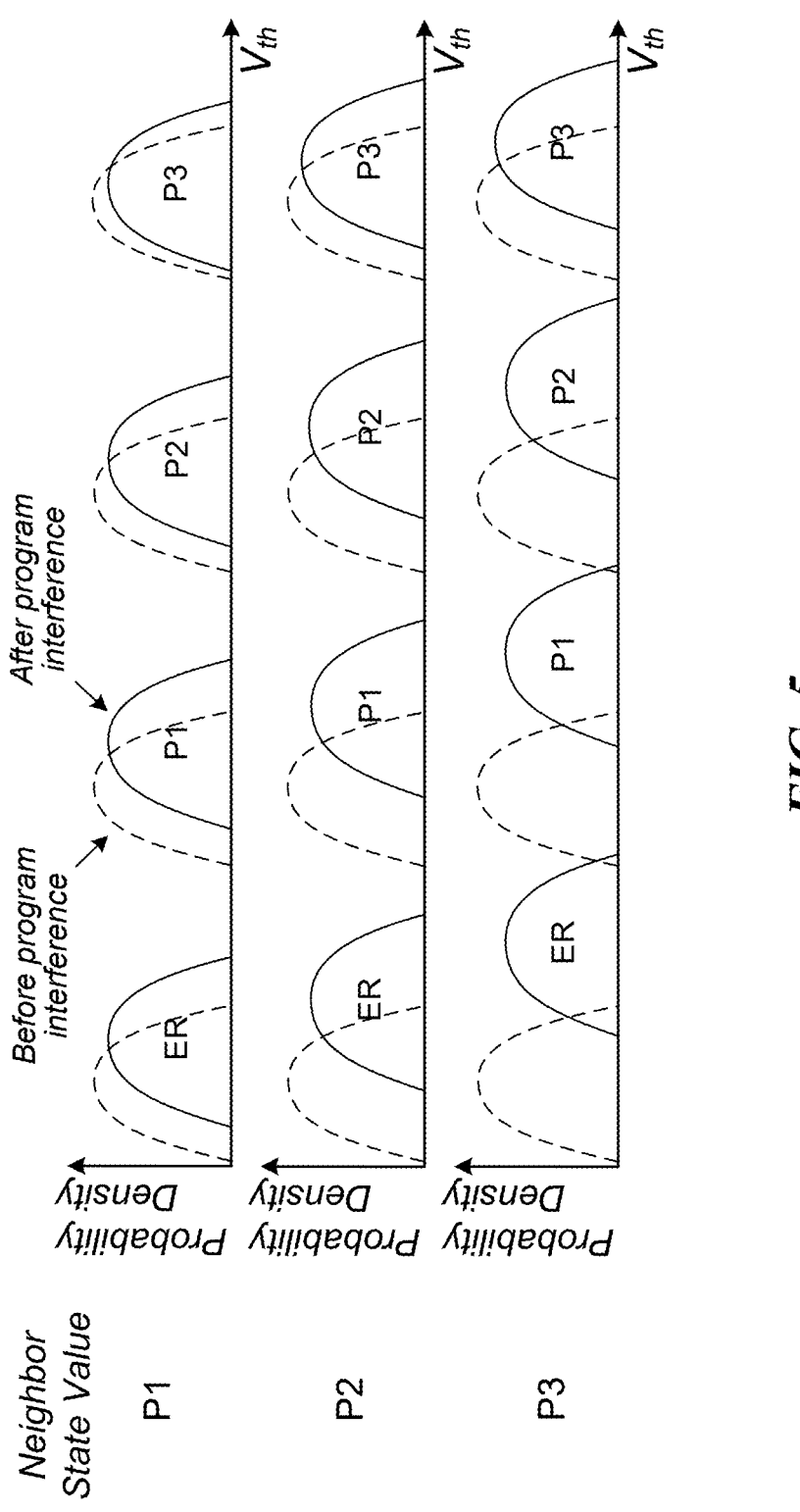
FIG. 5 is an example diagram illustrating the cell voltage level distribution ($V_{th}$) of a non-volatile memory device before and after program interference.

FIG. 5 illustrates an example of a cell-to-cell interference in NAND flash memory. The cell-to-cell interference can also cause threshold voltages of flash cells to be distorted. The threshold voltage shift of one memory cell transistor can influence the threshold voltage of its adjacent memory cell transistor through parasitic capacitance-coupling effect between the interfering cell and the victim cell. The amount of the cell-to-cell interference may be affected by NAND flash memory bit-line structure. In the even/odd bit-line structure, memory cells on one word-line are alternatively connected to even and odd bit-lines and even cells are programmed ahead of odd cells in the same word-line. Therefore, even cells and odd cells experience different amount of cell-to-cell interference. Cells in all-bit-line structure suffer less cell-to-cell interference than even cells in the even/odd bit-line structure, and the all-bit-line structure can effectively support high-speed current sensing to improve the memory read and verify speed.

The dotted lines in FIG. 5 denote the nominal distributions of P/E states (before program interference) of the cells under consideration, and the "neighbor state value" denotes the value that the neighboring state has been programmed to. As illustrated in FIG. 5, if the neighboring state is programmed to P1, the threshold voltage distributions of the cells under consideration shift by a specific amount. However, if the neighboring state is programmed to P2, which has a higher threshold voltage than P1, that results in a greater shift compared to the neighboring state being P1. Similarly, the shift in the threshold voltage distributions is greatest when the neighboring state is programmed to P3.

Figure 6:
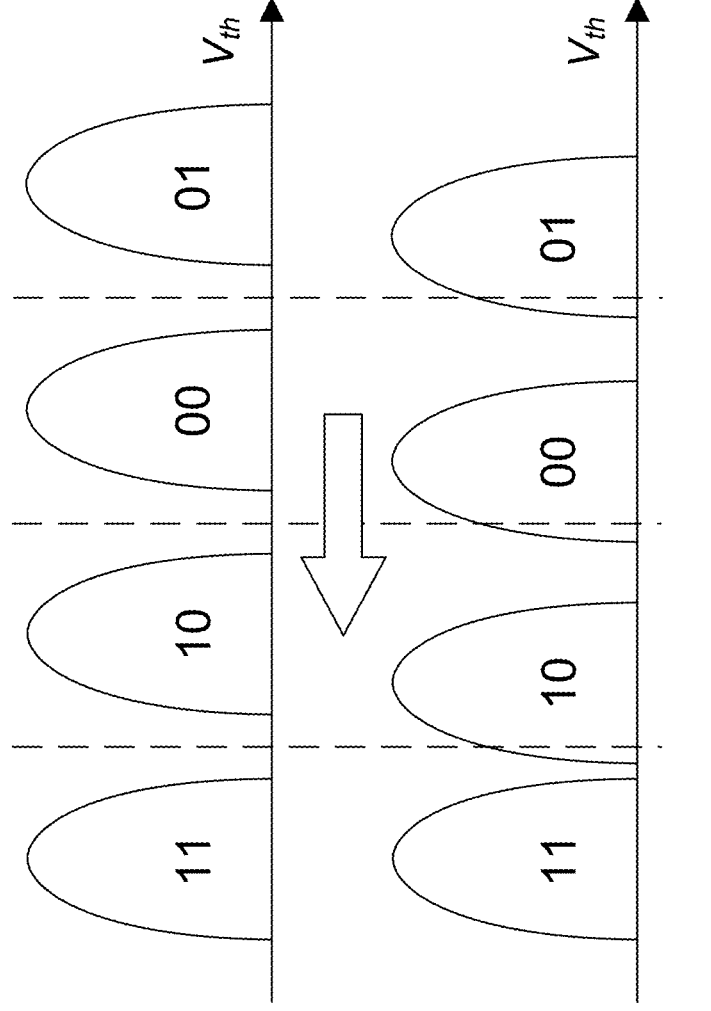
FIG. 6 is an example diagram illustrating the cell voltage level distribution ($V_{th}$) of a non-volatile memory device as a function of the reference voltage.

FIG. 6 illustrates an example of a retention error in NAND flash memory by comparing normal threshold-voltage distribution and shifted threshold-voltage distribution. The data stored in NAND flash memories tend to get corrupted over time and this is known as a data retention error. Retention errors are caused by loss of charge stored in the floating gate or charge trap layer of the cell transistor. Due to wear of the floating gate or charge trap layer, memory cells with more program erase cycles are more likely to experience retention errors. In the example of FIG. 6, comparing the top row of voltage distributions (before corruption) and the bottom row of distributions (contaminated by retention error) reveals a shift to the left.

2 Examples of Self-Learning Asymmetric Bit-Flipping Decoders

Low-density parity check (LDPC) codes are often used to as forward error correction codes in non-volatile memory devices (e.g., as described in FIGS. 1-6) due to their excellent correction performance and low complexity. LDPC codes are usually represented by bipartite graphs including two sets of nodes. One set of nodes, the variable or bit nodes, corresponds to elements of the codeword, and the other set of nodes, the check nodes, corresponds to the set of parity-check constraints satisfied by the codeword. The connections between the variable nodes and the check nodes are defined by a parity-check matrix H of the LDPC code.

Figures 7A, 7B:
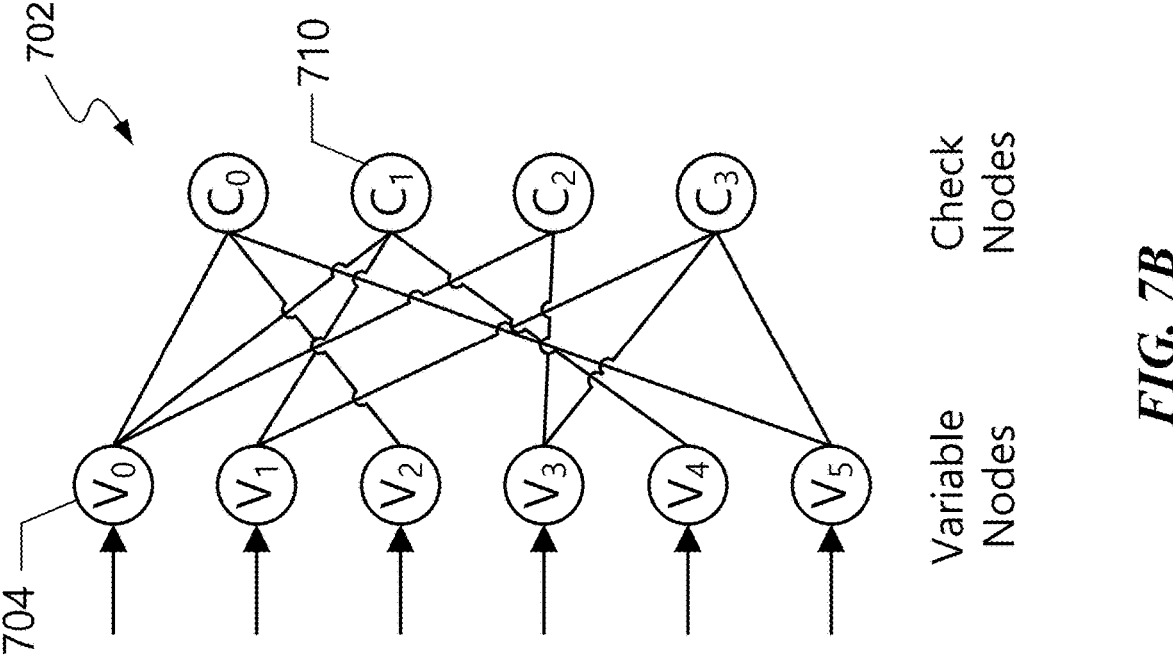
FIG. 7A illustrates an example parity-check matrix and FIG. 7B illustrates an example bipartite graph corresponding to the parity-check matrix in FIG. 7A.

FIG. 7A illustrates an example parity-check matrix H 700 and FIG. 7B illustrates an example bipartite graph corresponding to the parity-check matrix 700. In this example, the parity-check matrix 700 has six column vectors and four row vectors. Network 702 shows the network corresponding to the parity-check matrix 700 and represents a bipartite graph. Various type of bipartite graphs are possible, including, for example, a Tanner graph.

As shown in FIGS. 7A and 7B, the variable nodes in the network 702 correspond to the column vectors in the parity-check matrix 700. The check nodes in the network 702 correspond to the row vectors of the parity-check matrix 700. The interconnections between the nodes are determined by the values of the parity-check matrix 700. Specifically, a "1" indicates that the corresponding check node and variable nodes have a connection. A "0" indicates that there is no connection. For example, the "1" in the leftmost column vector and the second row vector from the top in the parity-check matrix 700 corresponds to the connection between the variable node 704 and the check node 710.

LDPC decoders can be configured to operate using low-complexity iterative message-passing decoding methods like bit-flipping algorithm, min-sum algorithms, or sum-product algorithms. In a bit-flipping (BF) decoder, there are many parameters of the BF decoder that need to be optimized to achieve desirable correction capability, performance, and/or throughput. Such optimizations can be performed by assuming certain statistical characteristics (or simply, statistics) related to the non-volatile memory, e.g. the failed bit count (FBC) and an asymmetric ratio of the bit errors. In some examples, these statistics can vary on a per-sector basis. However, when the current state of the non-volatile memory (or rather, a sector thereof) has different statistics from the assumed statistics, the optimized BF decoder can perform poorly due to the mismatch between the assumed statistics and the real (or current) statistics. Because the BF decoder plays an essential role in non-volatile memory systems (e.g., it typically provides greater than 90% of the throughput of the system), maintaining its optimality in different NAND conditions is paramount for efficient operation of the memory device. Embodiments of the disclosed technology provide a self-learning method that enables the BF decoder to learn from live traffic and statistics, and adapt its parameters to achieve optimal error correction, throughput and performance, which improves the quality-of-service (QoS) of the memory device.

In some embodiments, the sector-specific noise statistics are determined and used to configure the BF decoder with parameters that are optimal for those particular noise statistics. If the BF decoder parameters are optimized for static noise statistics or a mixture of different noise statistics, the correction capability and throughput of the BF decoder can degrade significantly.

Embodiments of the disclosed technology provide a BF decoder that is optimal in dynamic noise conditions. In some embodiments, an offline parameter optimization is used for all combinations of conditions. In other embodiments, online-learning is used in a BF decoder to perform on-the-fly learning of noise statistics on a sector-by-sector, which is then used to select the optimal parameters for each sector separately. In yet other embodiments, the BF decoder can be configured to process multiple columns of the parity-check matrix that have the same weight (e.g., the same number of "1" entries in a column) using the same set of parameters. Herein, the multiple columns with the same weight can be processed in parallel or consecutively, and are referred to as a "column zone." In yet other embodiments, the BF decoder can be configured to use the same set of parameters for multiple (but not all) iterations of the BF decoder. Herein, a set of these multiple iterations is referred to as an "iteration zone."

2.1 Examples of Static Optimization and Inference with a Neural Network

Figures 8A, 8B:
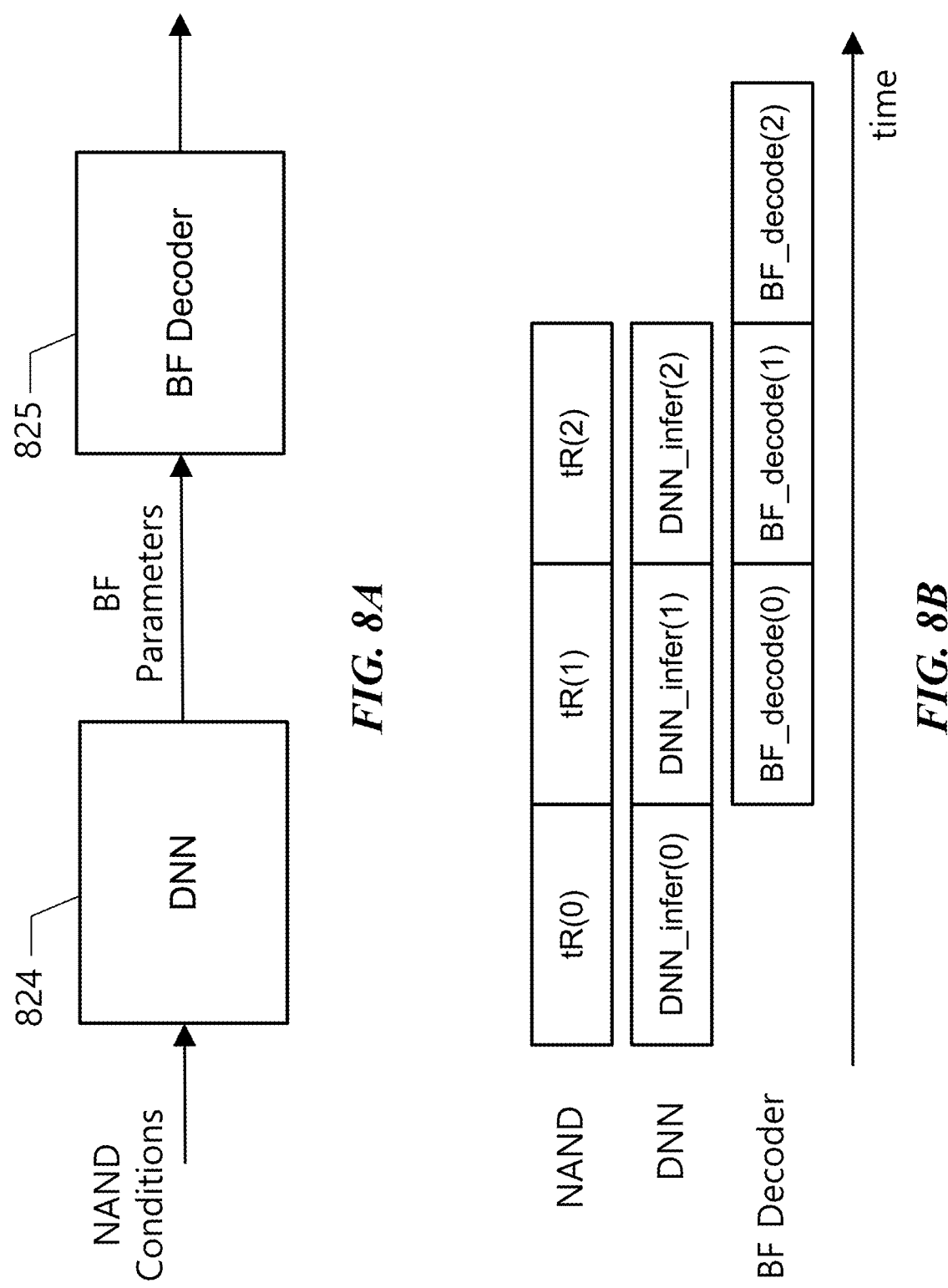
FIG. 8A is a block diagram illustrating an example system that uses static optimization and inference to determine parameters of a bit-flipping decoder.
FIG. 8B is a timing diagram illustrating the operation of the system of FIG. 7A.

In some embodiments, as shown in FIG. 8A, the NAND conditions are input to a neural network 824 (e.g., a deep neural network (DNN)), which processes the input to generate optimal BF parameters that are input to the BF decoder 825. In the example shown in FIG. 8A, it is assumed that the BF decoder parameters to be optimized are denoted P=[P0, P1, . . . , Pn] and the noise statistics are a function of the NAND conditions C=[C0, C1, . . . , Cm], wherein n=0, 1, . . . , N, m=0, 1, . . . , M, and with N and M being integers greater than one. In some examples, P can include, but is not limited to, a flipping threshold per column zone and per iteration zone. In some examples, C can include, but is not limited to, NAND endurance, retention, read/write temperature, wordline (WL) index, and the like. Herein, the NAND noise statistics in each of the NAND conditions C1, C2, . . . , Ck are collected, and optimal BF decoder parameters P1, P2, . . . , Pk are determined for each corresponding NAND condition.

In some examples, the NAND noise statistics are collected as described in "Threshold Voltage Distribution in MLC NAND Flash Memory: Characterization, Analysis, and Modeling" by Y. Cai et al. (in *Proceedings of the Conference on Design, Automation and Test in Europe, IEEE*, 2013) and "Error Characterization, Mitigation, and Recovery in Flash Memory Based Solid-State Drives" by Y. Cai et al. (in *Proceedings of the IEEE*, Volume 105, Issue 9, 2017), and that model, for example, the noise due to Program/Erase (P/E) cycling as additive white Gaussian noise (AWGN), and the threshold voltage distribution of flash cells that store the same value as either a Gaussian distribution or a Beta distribution.

In some embodiments, and due to there being a large number of conditions, a deep neural network (DNN) can be configured to determine the relationship between Ci and Pi. For example, a small number of samples [Ci, Pi], i=0, 1, . . . , k, can be used to train the DNN, which is configured to interpolate the values of any missing conditions. In some examples, the DNN is configured to use a greedy optimization algorithm to determine the optimal set of parameters Pi (i.e., the DNN output) for a set of input NAND conditions Ci (i.e., the DNN input). In some examples, the DNN is configured as a fully-connected neural network with rectified linear unit (ReLU) activation. In other examples, the number of training samples ranges from 103 to 105, and includes data for different P/E cycling values (e.g., 1, 1 k, 5 k, 7 k, 10 k, . . . ), different retention capabilities (e.g., 1 day, 9 days, 15 days, 30 days, . . . ), and different read disturb error performances (e.g., 1, 1 k, 500 k, 1M, . . . ).

When the BF decoder is decoding a codeword from a particular sector, the NAND conditions associated with that particular sector are input to the DNN, and optimal BF decoder parameters (on a per-sector basis) are output by the DNN. In the described embodiments, and as shown in FIG. 8B, the latency of DNN inference is hidden underneath the read latency (tR) of the memory device by pipelining operations in the memory device. As shown therein, the read operation being pipelined with the inference operation results in the read latency for the read operation for the first codeword (denoted tR(0)) overlapping with the DNN inference operation (denoted DNN_infer(0)) that determines the optimal BF parameters for that first codeword (or the sector from which the first codeword was read). The BF decoding operation for the first codeword (denoted BF_decode(0)) is performed subsequent to the pipelined operations for the first codeword, and which coincides with the read and inference operations for the second codeword (denoted tR(1) and DNN_infer(1) in FIG. 8B, respectively).

Implementing the pipelining operations ensures that when data (e.g., a codeword) is ready to be processed by the BF decoder, the optimal BF decoder parameters are made available to the BF decoder prior to (or, substantially the same time as) the codeword being ready to be processed, i.e., with no additional latency. In some embodiments, the DNN inference can be initiated by the firmware (FW) associated with the memory device or a system-on-chip (SoC) associated with the memory device or BF decoder (and based on the implementation).

The efficacy of the described methods have been verified using simulations. Therein, using a static greedy optimization shows a 30-50 bit improvement in the codeword failure rate (CFR) performance in the waterfall region. The optimal thresholds are determined via Monte-Carlo simulations and any available data associated with the NAND condition.

2.2 Examples of Iterative Online Learning

In some embodiments, when the NAND statistics are unavailable or the NAND device is not mature during SoC development, the BF decoder is enhanced with an online learning or calibration capability. Herein, the knowledge learnt (e.g., optimal set of parameters being determined) is applied to the BF decoder on-the-fly and without any delay in the decoding process, e.g., parameters for a particular codeword are determined during the processing of that particular codeword, and immediately applied thereto. In these described embodiments, the learning operation, the parameter tuning, and decoding operations are performed in parallel.

Figure 9:
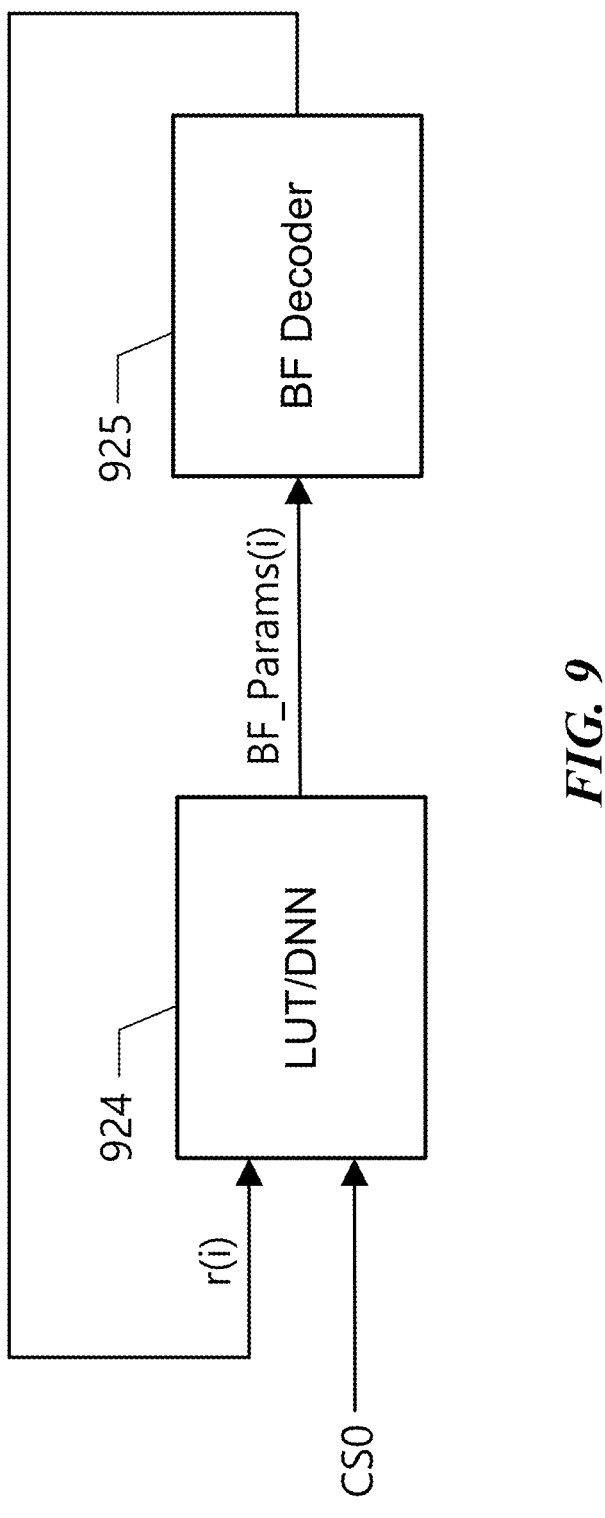
FIG. 9 is a block diagram illustrating another example system that uses iterative online learning to determine parameters of a bit-flipping decoder.

FIG. 9 shows an example system for iterative online learning. As shown therein, a look-up table (LUT) or deep neural network (DNN) 924 is configured to receive a checksum (CS) and an asymmetric ratio (r) as inputs, and output an optimal set of parameters that are passed to the BF decoder 925. Although the checksum, which serves as a proxy for the failed bit count (FBC), can be readily ascertained at the start of decoding a codeword, it is difficult to estimate the asymmetric ratio from the initial data at the BF decoder input.

In some embodiments, the BF decoder 925 is run for a first number of iterations (N1) on the received codeword, and at the completion of N1 iterations, the hard decisions are compared to the received codeword. Based on the comparison, the number of bits that flipped from a "0" to a "1" (denoted $e_{0 \to 1}$) are counted, as are the number of bits that flipped from a "1" to a "1" (denoted $e_{1 \to 0}$). The asymmetric ratio (r), after N1 iterations, can be computed as:

$$r_{N1} = \frac{e_{1 \to 0}}{e_{0 \to 1}}.$$

Alternatively, the inverse ratio can be computed as the asymmetric ratio. Then, the initially received checksum (CS0) and the asymmetric ratio computed after N1 iterations ($r_{N1}$) are input to the LUT/DNN 924 in order to compute the optimal set of parameters for the BF decoder 925. The BF decoder 925 is then configured with the determined optimal set of parameters and run for the remaining N2 iterations; and where it is assumed that N1+N2=N, which is the total number of iterations that the BF decoder 925 is configured to run. In some embodiments, N1=1. In other embodiments, N1 can be configured to be any value as long as the constraint N1+N2=N is satisfied. In yet other embodiments, the total number of iterations (N) can be divided into more than two subsets of iterations, e.g., N=N1+N2+ . . . +NK. In this case, the asymmetric ratio is computed after each subset of iterations, resulting in $r_{N1}$, $rN_2$, . . . , $r_{NK}$, and is used to determine the optimal set of parameters that are used to configure the BF decoder 925 for the next subset of iterations. Furthermore, the checksum that is input to the LUT/DNN 924 can be either the initially received checksum (CS0) or can be recomputed based on the hard decisions output after the corresponding subset of iterations.

In some embodiments, the LUT/DNN 924 can be implemented as a deep neural network (DNN) that is similar to the DNN 824 described in the context of FIG. 8 (with the details being covered in Section 2.1, and not repeated here).

In some embodiments, the LUT/DNN 924 can be implemented as a look-up table (LUT), which can be precomputed offline and has negligible latency when used to determine the optimal BF decoder parameters. Herein, the LUT provides a one-to-one mapping from any pair of checksum (CS) and asymmetric ratio (r) values to a set of parameters for the BF decoder 925. In some examples, the LUT maps non-overlapping ranges for both the checksum and asymmetric ratio to a distinct set of BF decoder parameters. In other examples, one of the ranges for either the checksum or the asymmetric ratio are non-overlapping, whereas some ranges for the other parameter may be overlapping. In both cases, there is a one-to-one mapping between the input parameters (e.g., CS and r) and the output (e.g., the BF decoder parameters).

3 Examples Embodiments of the Disclosed Technology

FIG. 10 illustrates a flowchart of an example method 1000 for improving the performance of a memory device. The method 1000 includes, at operation 1010, determining a current set of noise statistics associated with a first sector of a non-volatile memory.

The method 1000 includes, at operation 1020, determining, based on the current set of noise statistics, a current set of values for one or more characteristics of the first sector.

The method 1000 includes, at operation 1030, inputting the current set of values for the one or more characteristics to a neural network.

The method 1000 includes, at operation 1040, using the neural network to determine, based on the current set of values, a current set of parameters for a BF decoder.

The method 1000 includes, at operation 1050, providing a codeword from the first sector to the BF decoder.

The method 1000 includes, at operation 1060, performing, subsequent to configuring the BF decoder with the current set of parameters, a decoding operation on the codeword to generate data that was encoded. In some embodiments, the decoding operation and the associated encoding operation are based on a parity-check matrix (e.g., H in FIG. 7A) of a linear block code (e.g., an LDPC code).

In some embodiments, the neural network is trained using multiple sets of parameters for the BF decoder, and each of the multiple sets of parameters is associated with a set of noise statistics corresponding to one of multiple sets of values for the one or more characteristics of the non-volatile memory.

In some embodiments, the current set of parameters comprises a flipping threshold for at least one set of iterations or column zone associated with the parity check matrix.

In some embodiments, the one or more characteristics of the non-volatile memory comprise a cumulative number of program/erase (PE) cycles, a data retention metric, a number of read disturb errors, a read/write temperature, or a word-line (WL) index.

In some embodiments, the current set of parameters is determined by the neural network using a greedy optimization algorithm.

In some embodiments, the BF decoder is configured on a per-sector basis.

In some embodiments, a latency of the neural network for determining the current set of parameters based on the current set of values is less than a read latency (e.g., tR in FIG. 8B) of the non-volatile memory. In some examples, the read latency is a minimum read latency of the non-volatile memory. In other examples, the read latency is an average read latency.

In some embodiments, the current set of parameters is available to the BF decoder prior to the BF decoder receiving the codeword from the first sector.

In some embodiments, a firmware or a system on chip (SoC) associated with the memory device is configured to initiate a determination of the current set of parameters, based on the current set of values for the one or more characteristics, by the neural network.

FIG. 11 illustrates a flowchart of an example method 1100 for improving the performance of a memory device. The method 1100 includes, at operation 1110, receiving, by an iterative BF decoder, a codeword and a checksum associated with the codeword.

The method 1100 includes, at operation 1120, performing a first number of iterations of a decoding operation on the codeword.

The method 1100 includes, at operation 1130, determining, based on a number of bit errors during the first number of iterations, an asymmetric ratio associated with the codeword.

The method 1100 includes, at operation 1140, determining, based on the checksum and the asymmetric ratio, a current set of parameters for the iterative BF decoder.

The method 1100 includes, at operation 1150, performing, subsequent to configuring the iterative BF decoder with the current set of parameters, a second number of iterations of the decoding operation on the codeword to generate data that was encoded. Herein, a sum of the first number of iterations and the second number of iterations is less than or equal to a maximum number of iterations configured for the iterative BF decoder.

In some embodiments, of operation of determining the asymmetric ratio (1130) includes the operations of (a) generating, after the first number of iterations, a hard decision for the codeword, (b) determining, based on comparing the hard decision to the codeword received by the iterative BF decoder, a first number of errors that flipped a one-valued bit to a zero-valued bit and a second number of errors that flipped the zero-valued bit to the one-valued bit, and (c) determining the asymmetric ratio as a ratio between the first number of errors and the second number of errors.

In some embodiments, the operation of determining the current set of parameters (1140) is based on a look-up table that stores multiple sets of parameters, and the method 1100 further includes the operations of (a) generating, based on the checksum and the asymmetric ratio, an index value, and (b) selecting, based on the index value, one of the multiple sets of parameters in the look-up table as the current set of parameters.

In some embodiments, the memory device comprises a non-volatile memory, the operation of determining the current set of parameters (1140) is based on using a neural network trained using multiple sets of parameters for the iterative BF decoder, and each of the multiple sets of parameters is associated with a corresponding checksum and a corresponding asymmetric ratio. In some examples, and as discussed in the context of FIG. 8B, a latency of the neural network for determining the current set of parameters is less than or equal to a read latency (e.g., tR in FIG. 8B) of the non-volatile memory. In other examples, the read latency is a minimum read latency of the non-volatile memory; in yet other examples, an average read latency.

Figure 12:
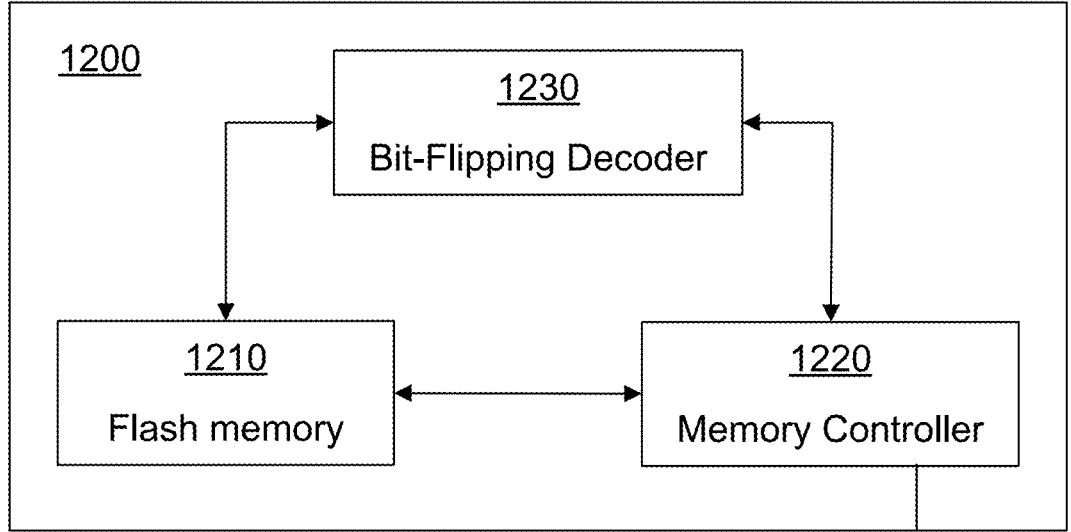
FIG. 12 is a block diagram illustrating an example storage device that can be configured to implement the described embodiments.

FIG. 12 is an example diagram illustrating a storage device that can be configured to implement the described embodiments. Referring to FIG. 12, a data storage device 1200 may include a flash memory 1210, a memory controller 1220, and a bit-flipping (BF) decoder 1230. The memory controller 1220 may control the flash memory 1210 and the BF decoder 1230 in response to control signals input from the outside of the data storage device 1200. In the data storage device 1200, the flash memory 1210 may be configured the same or substantially the same as a nonvolatile memory device. That is, the flash memory 1210 may read data from selected memory cells using different read voltages to output it to the memory controller 1220.

In some embodiments, the data storage device 1200 can be a memory card, an SSD, a multimedia card device, an SD card, a memory stick device, an HDD device, a hybrid drive device, or an USB flash device. For example, the data storage device 1200 may be a card which satisfies the standard for user devices such as a digital camera, a personal computer, and so on.

4 Conclusion

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for improving a performance of a memory device, comprising:

determining a current set of noise statistics associated with a first sector of a non-volatile memory of the memory device;

determining, based on the current set of noise statistics, a current set of values for one or more characteristics of the first sector of the non-volatile memory;

inputting the current set of values for the one or more characteristics to a neural network;

using the neural network to determine, based on the current set of values, a current set of parameters for a bit-flipping (BF) decoder in the memory device;

providing a codeword from the first sector to the BF decoder; and performing, subsequent to configuring the BF decoder with the current set of parameters, a decoding operation on the codeword, using a parity check matrix associated with an error-correcting code, to generate data that was encoded, wherein the neural network is trained using multiple sets of parameters for the BF decoder, and wherein each of the multiple sets of parameters is associated with a set of noise statistics corresponding to one of multiple sets of values for the one or more characteristics of the non-volatile memory.

2. The method of claim 1, wherein the current set of parameters comprises a flipping threshold for at least one set of iterations or column zone associated with the parity check matrix.

3. The method of claim 1, wherein the one or more characteristics of the non-volatile memory comprise a cumulative number of program/erase (PE) cycles, a data retention metric, a number of read disturb errors, a read/write temperature, or a wordline (WL) index.

4. The method of claim 1, wherein the current set of parameters is determined by the neural network using a greedy optimization algorithm.

5. The method of claim 1, wherein the BF decoder is configured on a per-sector basis.

6. The method of claim 1, wherein a latency of the neural network for determining the current set of parameters based on the current set of values is less than a read latency of the non-volatile memory.

7. The method of claim 6, wherein the read latency is a minimum read latency or an average read latency of the non-volatile memory.

8. The method of claim 1, wherein the current set of parameters is available to the BF decoder prior to the BF decoder receiving the codeword from the first sector.

9. The method of claim 1, wherein a firmware or a system on chip (SoC) associated with the memory device is configured to initiate a determination of the current set of parameters, based on the current set of values for the one or more characteristics, by the neural network.

10. A method for improving a performance of a memory device, comprising:

receiving, by an iterative bit-flipping (BF) decoder in the memory device, a codeword and a checksum associated with the codeword;

performing a first number of iterations of a decoding operation on the codeword;

determining, based on a number of bit errors during the first number of iterations, an asymmetric ratio associated with the codeword;

determining, based on the checksum and the asymmetric ratio, a current set of parameters for the iterative BF decoder;

performing, subsequent to configuring the iterative BF decoder with the current set of parameters, a second number of iterations of the decoding operation on the codeword to generate data that was encoded, wherein a sum of the first number of iterations and the second number of iterations is less than or equal to a maximum number of iterations configured for the iterative BF decoder.

11. The method of claim 10, wherein determining the asymmetric ratio comprises:

generating, after the first number of iterations, a hard decision for the codeword;

determining, based on comparing the hard decision to the codeword received by the iterative BF decoder, a first number of errors that flipped a one-valued bit to a zero-valued bit and a second number of errors that flipped the zero-valued bit to the one-valued bit; and determining the asymmetric ratio as a ratio between the first number of errors and the second number of errors.

12. The method of claim 10, wherein determining the current set of parameters is based on a look-up table that stores multiple sets of parameters.

13. The method of claim 12, comprising:

generating, based on the checksum and the asymmetric ratio, an index value; and selecting, based on the index value, one of the multiple sets of parameters in the look-up table as the current set of parameters.

14. The method of claim 10, wherein the memory device comprises a non-volatile memory, wherein determining the current set of parameters is based on using a neural network trained using multiple sets of parameters for the iterative BF decoder, and wherein each of the multiple sets of parameters is associated with a corresponding checksum and a corresponding asymmetric ratio.

15. The method of claim 14, wherein a latency of the neural network for determining the current set of parameters is less than a read latency of the non-volatile memory.

16. The method of claim 15, wherein the read latency is a minimum read latency or an average read latency of the non-volatile memory.

17. An apparatus for improving a performance of a memory device, comprising:

a bit-flipping (BF) decoder; and a memory controller configured to:

determine a current set of noise statistics associated with a first sector of a non-volatile memory of the memory device, determine, based on the current set of noise statistics, a current set of values for one or more characteristics of the first sector of the non-volatile memory, input the current set of values to a neural network, and use the neural network to determine, based on the current set of values, a current set of parameters for the BF decoder, wherein the BF decoder, subsequent to being configured with the current set of parameters, is configured to:

receive a codeword from the first sector, and perform a decoding operation on the codeword, using a parity check matrix associated with an error-correcting code, to generate data that was encoded, and wherein the neural network is trained using multiple sets of parameters for the BF decoder, and wherein each of the multiple sets of parameters is associated with a set of noise statistics corresponding to one of multiple sets of values for the one or more characteristics of the non-volatile memory.

18. The apparatus of claim 17, wherein the current set of parameters comprises a flipping threshold for at least one set of iterations or column zone associated with the parity check matrix.

19. The apparatus of claim 17, wherein the one or more characteristics of the non-volatile memory comprise a cumulative number of program/erase (PE) cycles, a data retention metric, a number of read disturb errors, a read/write temperature, or a wordline (WL) index.

20. The apparatus of claim 17, wherein a latency of the neural network for determining the current set of parameters based on the current set of values is less than a read latency of the non-volatile memory.

\* \* \* \* \*